United States Patent
Takeuchi

(10) Patent No.: US 8,264,750 B2
(45) Date of Patent: Sep. 11, 2012

(54) IMAGE READING APPARATUS

(75) Inventor: Hideo Takeuchi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 509 days.

(21) Appl. No.: 12/558,607

(22) Filed: Sep. 14, 2009

(65) Prior Publication Data

US 2010/0231987 A1 Sep. 16, 2010

(30) Foreign Application Priority Data

Mar. 11, 2009 (JP) ................................. 2009-057587

(51) Int. Cl.
*H04N 1/04* (2006.01)

(52) U.S. Cl. ........ 358/475; 358/484; 358/483; 358/482; 358/474; 358/496; 358/497

(58) Field of Classification Search .......................... None
See application file for complete search history.

(56) References Cited

U.S. PATENT DOCUMENTS

| | | | | |
|---|---|---|---|---|
| 7,085,023 | B2 * | 8/2006 | Okamoto et al. | 358/471 |
| 7,470,053 | B2 * | 12/2008 | Kuo | 362/617 |
| 7,532,800 | B2 * | 5/2009 | Iimura | 385/146 |
| 7,760,403 | B2 * | 7/2010 | Sakurai | 358/484 |
| 7,771,102 | B2 * | 8/2010 | Iwasaki | 362/613 |
| 7,995,252 | B2 * | 8/2011 | Okamoto et al. | 358/487 |
| 8,056,807 | B2 * | 11/2011 | Lo et al. | 235/454 |
| 8,109,651 | B2 * | 2/2012 | Chen | 362/249.02 |
| 2005/0248959 | A1 * | 11/2005 | Chiou | 362/602 |
| 2010/0226147 | A1 * | 9/2010 | Chiang et al. | 362/628 |
| 2011/0013237 | A1 * | 1/2011 | Takeuchi | 358/475 |

FOREIGN PATENT DOCUMENTS

JP 3139787 U 2/2008

* cited by examiner

*Primary Examiner* — Cheukfan Lee

(74) *Attorney, Agent, or Firm* — Sughrue Mion, PLLC

(57) ABSTRACT

There is provided an image reading apparatus including: a light source with arrayed light emitting elements; a light guide unit that scatters light emitted from the light source such that the light intensity is greater at end portions than at the central portion in the array direction of the light emitting elements, and guides the light to a reading position of a medium to be read; and an optical system that guides the light reflected at the reading position to a light detection unit that detects the light intensity.

8 Claims, 9 Drawing Sheets

IMAGE READING APPARATUS

CROSS-REFERENCE TO RELATED APPLICATION

This application claims priority under 35 USC 119 from Japanese Patent Application No. 2009-057587 filed on Mar. 11, 2009.

BACKGROUND

1. Technical Field

The present invention relates to an image reading apparatus.

2. Related Art

In image reading apparatuses, when reflected light from light irradiated onto an original is formed as an image on a CCD sensor using a lens, the brightness at the peripheral edge portions of the lens is more attenuated in comparison to the brightness in the vicinity of the center of the lens. This therefore leads to a tendency for the brightness of light received by the CCD sensor not to be uniform.

SUMMARY

The present invention provides an image reading apparatus that suppresses non-uniformity in the amount of reflected light detected by a light detection unit.

An aspect of the present invention provides an image reading apparatus including:

a light source with arrayed light emitting elements;

a light guide unit that scatters light emitted from the light source such that the light intensity is greater at end portions than at the central portion in the array direction of the light emitting elements, and guides the light to a reading position of a medium to be read; and an optical system that guides the light reflected at the reading position to a light detection unit that detects the light intensity.

BRIEF DESCRIPTION OF THE DRAWINGS

Exemplary embodiments of the present invention will be described in detail based on the following figures, wherein.

DETAILED DESCRIPTION

First Exemplary Embodiment

Figure 1:
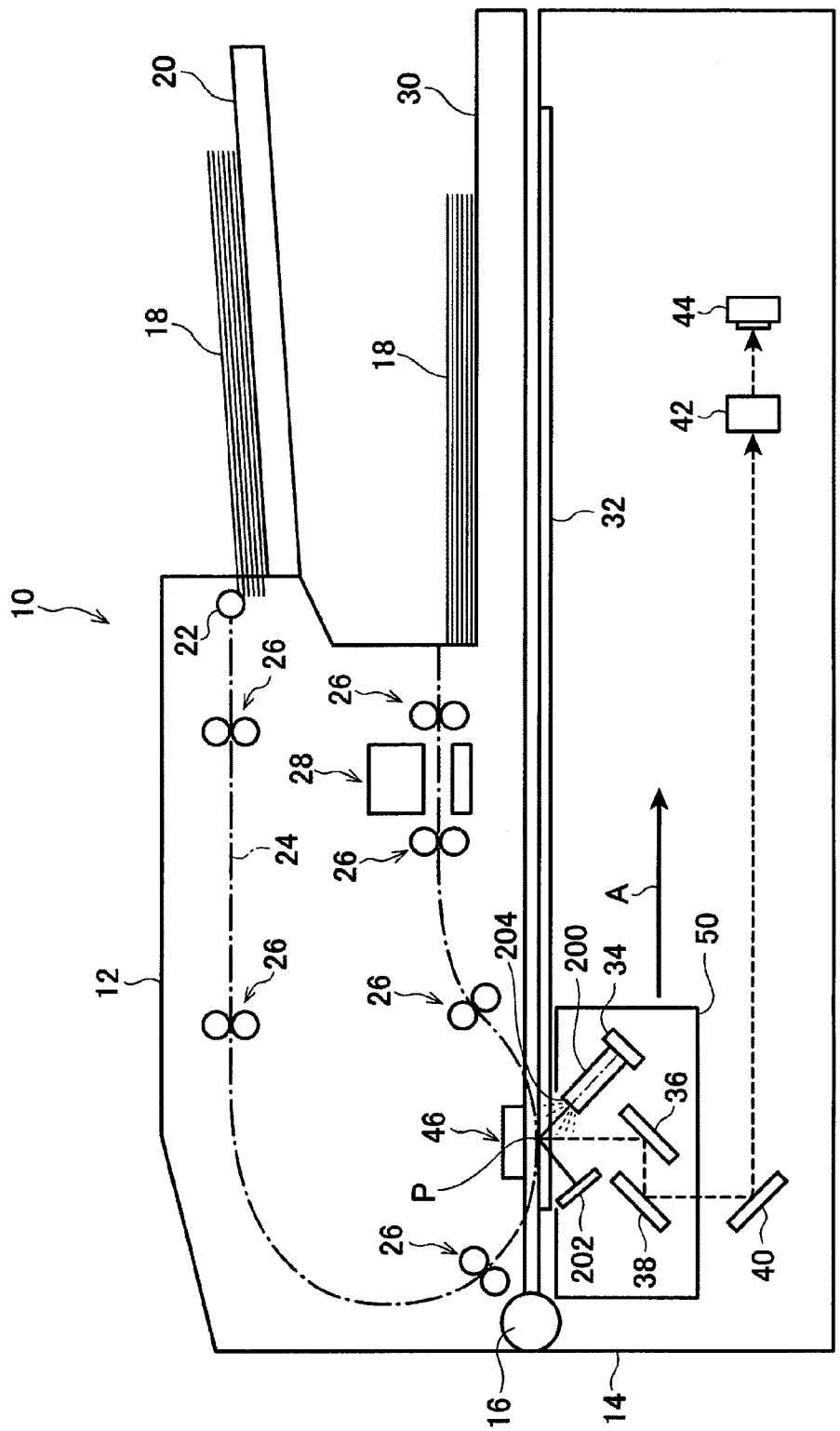
FIG. 1 is a cross-sectional view from the side showing a configuration of an image reading apparatus of a first exemplary embodiment.

Explanation will first be given of the overall configuration of an image reading apparatus 10 that is a first exemplary embodiment of the image reading apparatus of the present invention, with reference to FIG. 1. As shown in FIG. 1, the image reading apparatus 10 is a apparatus capable of reading both sides of an original 18, and is equipped with an original conveying unit 12 and an image reading unit 14. The original conveying unit 12 and the image reading unit 14 are connected together by a connection unit 16, such that the original conveying unit 12 is capable of being opened upward from the image reading unit 14, with the connection unit 16 at the center of rotation.

The original conveying unit 12 is equipped with an original plate 20 on which is placed the original 18 that has an image recorded thereon. The original 18 placed on the original plate 20 is fed in one page at a time by a feed-in roll 22 and fed into a conveying path 24.

The original 18 that has been fed into the conveying path 24 is conveyed by conveying rolls 26 up to the front face reading position P of the image reading unit 14, where the front face is read by the image reading unit 14. The original 18 is then conveyed to a back face image reading unit 28, positioned further downstream than the front face reading position P, where the back face is read by the back face image reading unit 28. The original 18 is then discharged into a discharge unit 30.

The image reading unit 14 is equipped with a transparent platen glass 32, capable of having the original 18 placed on the top face of the platen glass 32, the front face reading position P being positioned at the top face of the platen glass 32.

Below the platen glass 32 at the front face reading position P are provided: a light source 34 that emits illumination light toward the front face of the original 18; a light guide member 200 that guides illumination light emitted from the light source 34 to the vicinity of the front face reading position P of the platen glass 32; a filter 204 bonded to the light emitting face of the light guide member 200, the filter 204 having recesses and projections 206 (so-called texturing) formed on the front face and/or the back face (bonding face) thereof for scattering the illumination light; a reflector 202 that reflects the illumination light scattered by the recesses and projections 206 of the filter 204 toward the front face reading position P of the original 18; a first refection mirror 36 that receives reflected light reflected off the front face of the original 18; a second reflection mirror 38 for bending the path direction of the reflected light received by the first refection mirror 36 by 90°; and a third reflection mirror 40 for bending the path direction of the reflected light received by the second refection mirror 38 by a further 90°.

The image reading unit 14 is further equipped with a lens 42 that forms the reflected light reflected by the third reflection mirror 40 into an image, and a light detection unit 44 that detects the amount of the reflected light formed into an image by the lens 42 and outputs an image signal according to the light intensity to an external device, which will be described later.

In the image reading apparatus 10 according to the present exemplary embodiment, a CCD sensor configured with plural CCD's (Charge Coupled Devices) is employed for the light detection unit 44, however there is no limitation thereto, and a CMOS (Complementary Metal-Oxide Semiconductor) image sensor or the like may also be employed.

In the image reading apparatus 10, the light source 34, the first refection mirror 36, the second reflection mirror 38, and the third reflection mirror 40 are fixed to a carriage 50. The light source 34, the first refection mirror 36, the second reflection mirror 38, and the third reflection mirror 40 are movable in the direction shown by arrow A of FIG. 1 by moving the carriage 50. Thereby, when the original conveying unit 12 is opened and the original 18 is placed on the top face of the platen glass 32, the image recorded on the original 18 is readable by moving the light source 34, the first refection mirror 36, the second reflection mirror 38, and the third reflection mirror 40 in the direction of arrow A while illumination light is being emitted from the light source 34 toward the original 18.

In the image reading apparatus 10 of the present exemplary embodiment, the original conveying unit 12 is equipped at the front face reading position P with a reference plate 46, and illumination light emitted from the light source 34 is reflected by the reference plate 46 and the light intensity of reflected light is detected by the light detection unit 44.

Figure 2:
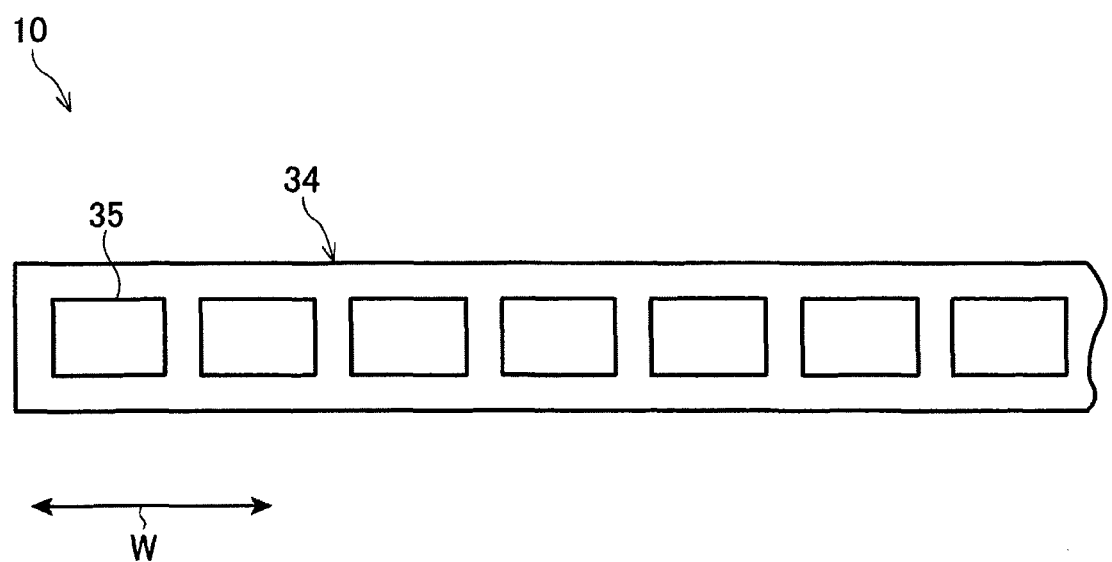
FIG. 2 is a plan view showing a light source of the first exemplary embodiment.

As shown in FIG. 2, the light source 34 is configured with plural light emitting elements 35 that emit light arrayed on a substrate at uniform intervals along a fast scanning direction W (a direction orthogonal to the conveying direction of the original 18). It should be noted that while the present exemplary embodiment employs LED (Light Emitting Diode) elements for the light emitting elements 35 there is no limitation thereto, and other light emitting elements may be employed, such as organic EL (Electro Luminescent) elements, inorganic EL elements, etc.

Figure 3:
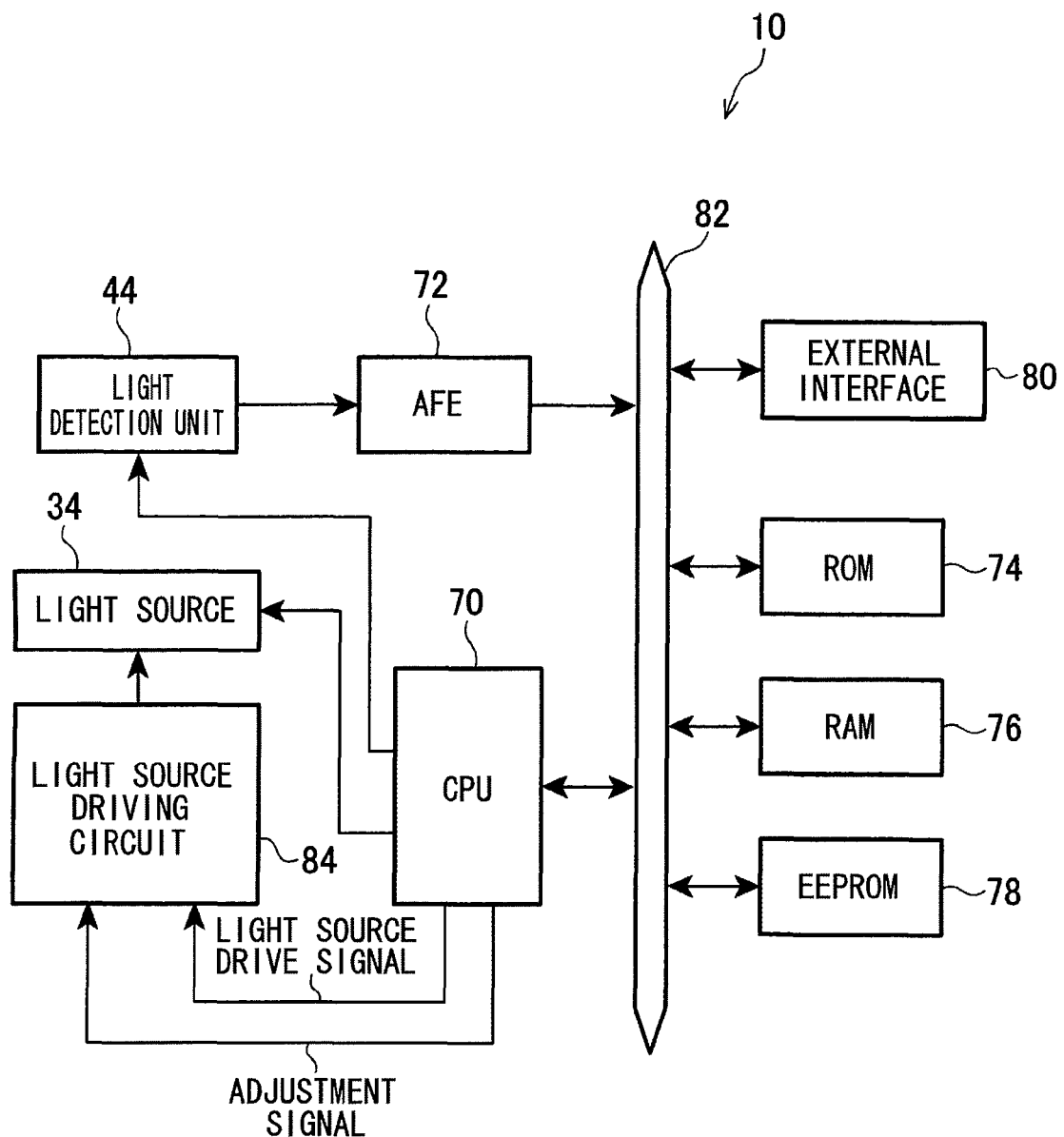
FIG. 3 is a block diagram showing a configuration of major portions of an electrical system of an image reading apparatus of the first exemplary embodiment.

As shown in FIG. 3, the image reading apparatus 10 is equipped with: a CPU (Central Processing Unit) 70 that controls the overall operation of the image reading apparatus 10; an AFE (Analog Front End) 72 that, after subjecting the image signal output from the light detection unit 44 to specific analog signal processing, performs analog-digital conversion thereon converting into digital image data; a ROM (Read Only Memory) 74, in which various programs and various parameters and various data tables etc. are stored in advance; a RAM (Random Access Memory) 76 that the CPU 70 uses as a working area etc. when executing various programs, and that stores the above digital image data; an EEPROM (Electrically Erasable and Programmable Read Only Memory) 78 that is a nonvolatile memory capable of storing and holding various types of data and also overwriting the data; and an external interface 80 that is connected to external device(s) such as a printer and a personal computer (referred to as a "PC" below), the external interface 80 transmitting the above digital image data to the external devices and transmitting and receiving various data to and from the external devices.

The CPU 70, the AFE 72, the ROM 74, the RAM 76, the EEPROM 78, and the external interface 80 are mutually electrically connected together by a system bus 82. Consequently, the CPU 70 can control the operation of the AFE 72, can access the ROM 74, the RAM 76 and the EEPROM 78, and can transmit and receive various data to and from the above external devices through the external interface 80.

The image reading apparatus 10 is also equipped with a light source driving circuit 84 for driving the light source 34.

The light source driving circuit 84 is connected to the CPU 70, and a light source drive signal, for ON-OFF control of the emission of light from the light emitting elements 35, and an adjustment signal, for adjusting the light intensity, are input to the light source driving circuit 84 from the CPU 70. The light source driving circuit 84 drives the light source 34 based on the light source drive signal and the adjustment signal.

The light detection unit 44 and the light source 34 are also connected to the CPU 70, the CPU 70 operates the light detection unit 44, and controls whether or not electrical power is supplied to the light emitting elements 35 provided in the light source 34.

Figure 4:
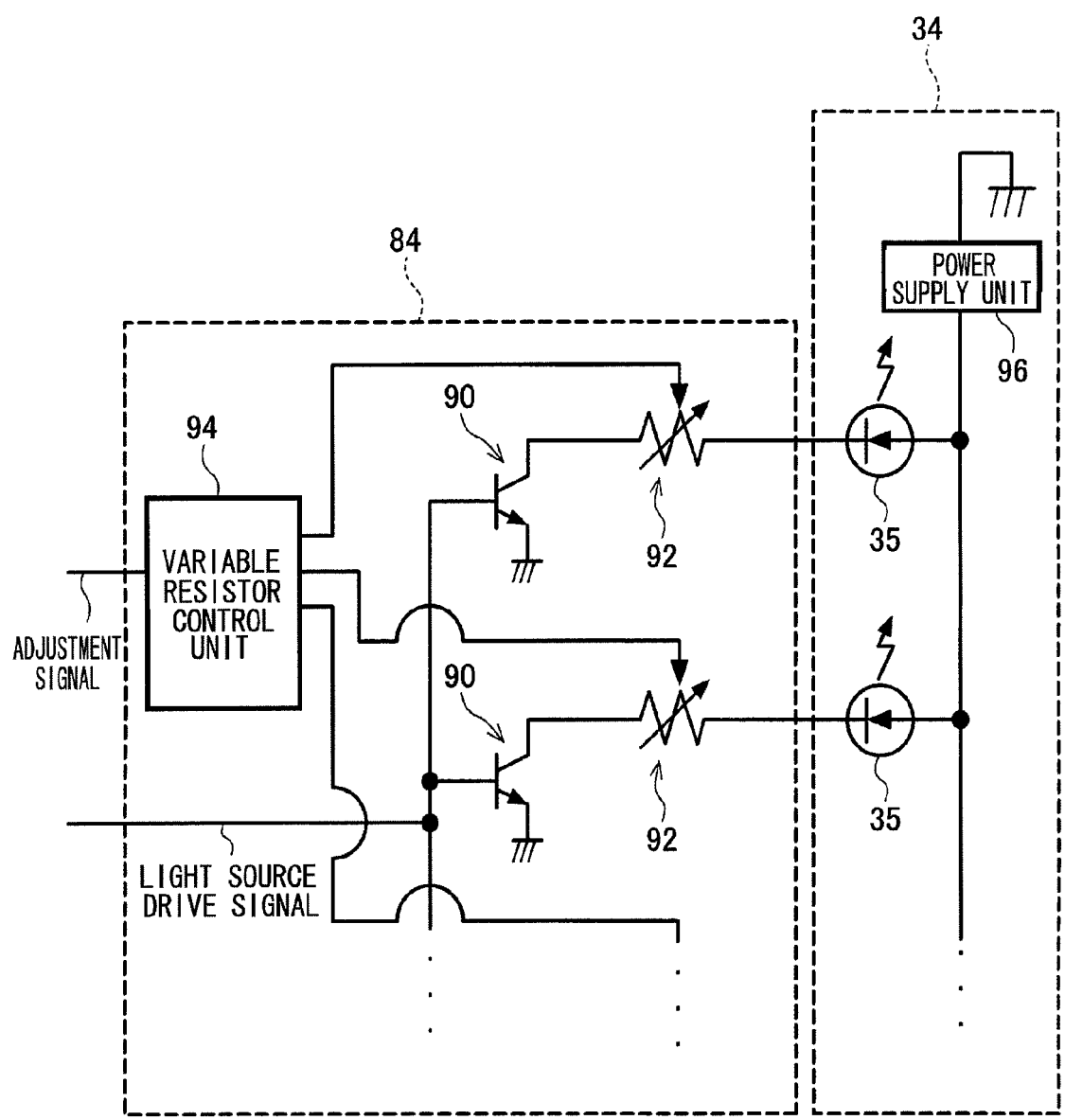
FIG. 4 is a circuit diagram showing a configuration of a light source driving circuit of the first exemplary embodiment.

As shown in FIG. 4, the light source driving circuit 84 is equipped with a switch 90 that, for each of the light emitting elements 35, switches irradiation of illumination light from the light emitting elements 35ON or OFF according to the light source drive signal input from the CPU 70, and variable resistors 92 that adjust the light intensity of the illumination light irradiated from the light emitting elements 35.

It should be noted that while the light source driving circuit 84 according to the present exemplary embodiment employs a NPN transistor as the switch 90 there is no limitation thereto, and obviously other electrical ON-OFF capable switches may be employed, such as a field effect transistor, a relay switch etc.

The light source driving circuit 84 of the present exemplary embodiment is also equipped with a variable resistor control unit 94 that adjusts the resistance values of each of the variable resistors 92 based on the adjustment signal input from the CPU 70 for each of the light emitting elements 35.

The light source 34 is provided with a power supply unit 96 and power is supplied from the power supply unit 96 to each of the light emitting elements 35.

In the present exemplary embodiment the variable resistor control unit 94 controls the resistance values of each of the variable resistors 92 so that the light intensity of illumination light emitted from each of the light emitting elements 35 is substantially uniform.

Figure 5:
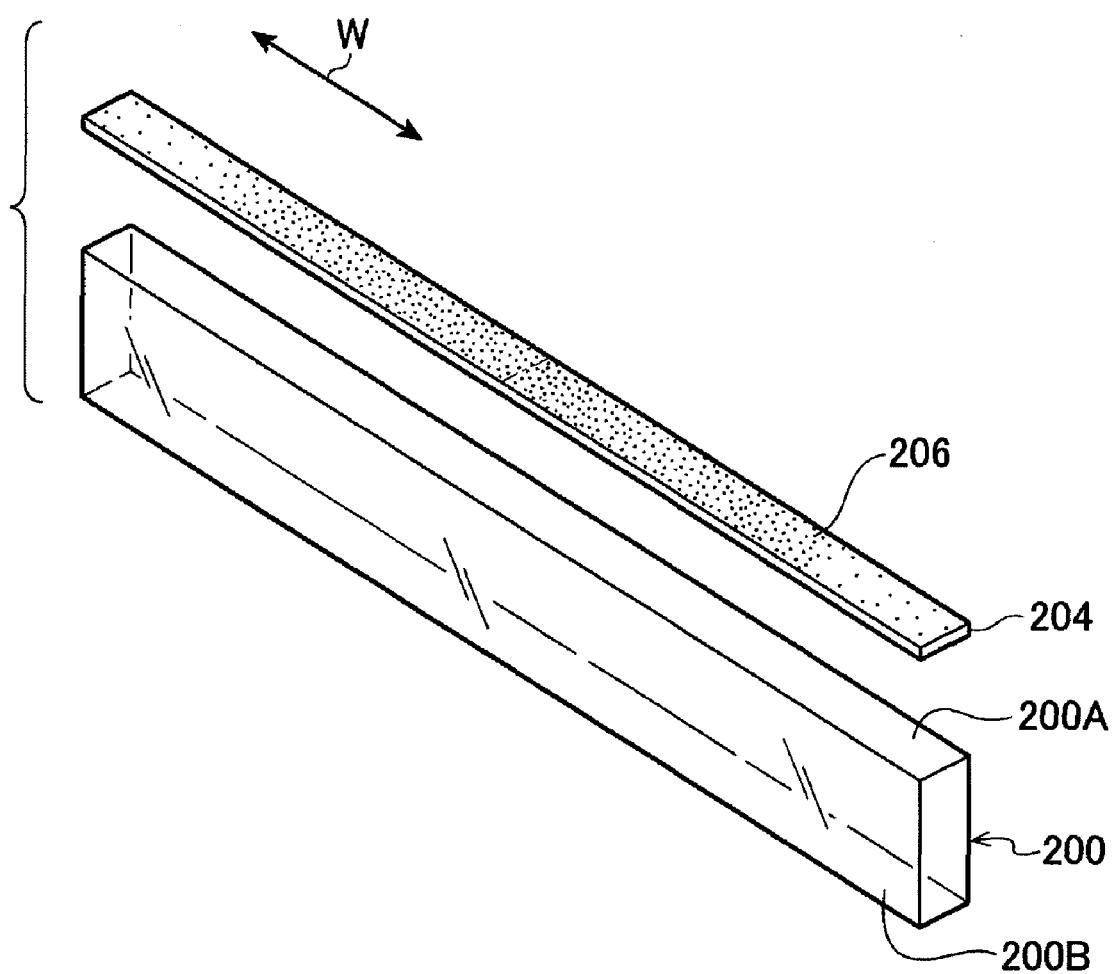
FIG. 5 is a perspective view of a light guide member and a filter of the first exemplary embodiment.
Figure 6:
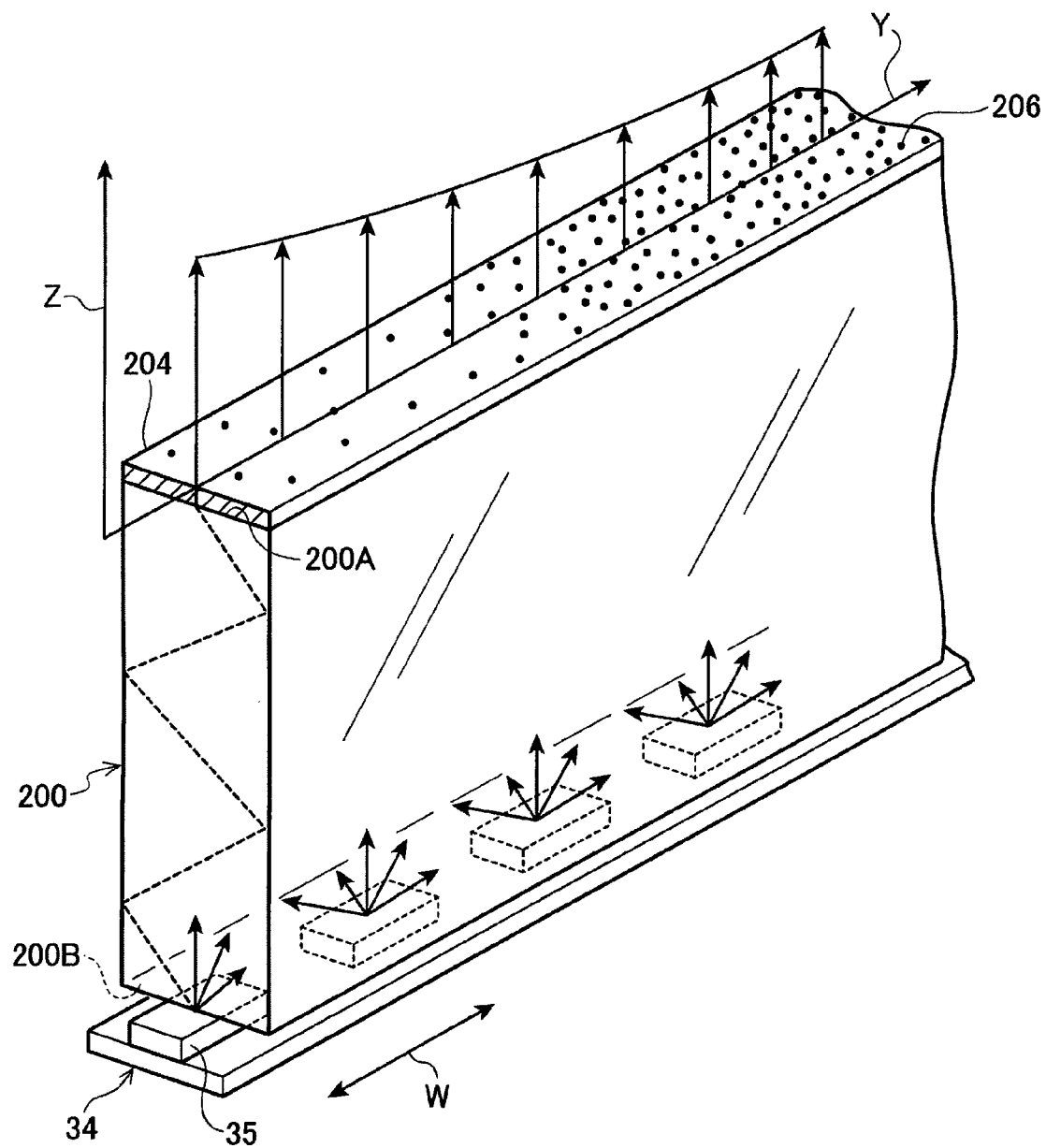
FIG. 6 is a perspective view showing a scattered state of illumination light when illumination light emitted from a light source passes through a light guide member and a filter, and a light intensity distribution of the illumination light.

A detailed explanation will now be given of the light guide member 200 and the filter 204, with reference to FIG. 5. As shown in FIG. 5, the light guide member 200 is formed from glass in a substantially rectangular body shape (with the length direction thereof along the fast scanning direction W), and a transparent filter 204 is bonded to the light emitting face 200A of the illumination light. The light guide member 200, as shown in FIG. 6, guides illumination light emitted from the light source 34 to the vicinity of the front face reading position P, and the light guide member 200 internally scatters illumination light, having directional characteristics, at least in the length direction (the fast scanning direction W in the present exemplary embodiment). Therefore, the light emitting face 200A becomes a light emitting face for emitting internally scattered illumination light from the light source 34, and as such functions to suppress non-uniformity in the light intensity distribution at the light emitting face 200A. Since the light guide member 200 guides illumination light from the light source 34 to the vicinity of the front face reading position P, the light guide member 200 is preferably formed from a material that at least does not attenuate the light intensity by more than occurs in air (for example optical glass, crystal glass etc.).

The recesses and projections 206 for scattering illumination light are formed on the surface of the filter 204 with coarser intervals at the end portions than at the central portion in the fast scanning direction W (the array direction of the light emitting elements 35). When the illumination light surface light emitted by the light emitting face 200A passes out through the filter 204, since the illumination light is more scattered at the central portion than at the end portions, as shown in FIG. 6, a light intensity distribution is achieved with the light intensity at the end portions greater than at the central portion in the fast scanning direction W. The Y axis shown in FIG. 6 indicates the position along the length direction of the light guide member 200, and the Z axis indicates the light intensity. In the present exemplary embodiment the numbers of recesses and projections 206 provided is adjusted so that the light intensity distribution of the illumination light passing through the filter 204 shows a smooth increase from the central portion toward the end portions in the fast scanning direction W, however the present invention is not limited so such a configuration. For example, the surface of the filter 204 may be partitioned into uniform regions, and the number of recesses and projections 206 provided as a group in each region adjusted. It should be noted that while in the present exemplary embodiment the recesses and projections 206 are formed to the front face of the filter 204, the recesses and projections 206 may also be formed to the back face (bonding face) of the filter 204.

Explanation will now be given of the operation of the first exemplary embodiment of the present invention.

The original 18 is placed on the original plate 20, and when the image reading apparatus 10 is actuated, the original 18 is conveyed though the image reading unit 14 to the front face reading position P of the image reading unit 14. The illumination light is then emitted from the light source 34. The illumination light emitted from the light source 34 passes through the light guide member 200 and is more scatted by the recesses and projections 206 of the filter 204 at the central portion than at the end portions of the fast scanning direction W, so as to give a light intensity distribution with a greater light intensity at the end portions than in the central portion in the fast scanning direction W. The illumination light that has achieved this light intensity distribution is irradiated onto the original 18 on the front face reading position P. Reflected light that has been reflected by the original 18, or by the reference plate 46, is transmitted to the lens 42 via the first refection mirror 36, the second reflection mirror 38, and the third reflection mirror 40, and the reflected light is formed into an image by the lens 42. Since the lens 42 employed is a general purpose converging lens, light passing through the edge portion (end portions) when forming the image is attenuated more than light passing through the central portion of the spherical face of the lens. However, the light intensity of the illumination light that has passed through the filter 204 has a light intensity distribution with a greater light intensity at the end portions than at the central portion in the fast scanning direction W (or in other words, a non-uniform light intensity distribution) and so the reflected light of the reflected illumination light has a similar light intensity distribution thereto. Therefore, the light intensity after passing through the lens 42 and forming an image has a light intensity distribution that suppresses non-uniformity from attenuation at the end portions in the fast scanning direction W.

By deriving in advance the degree of light attenuation occurring at the edge portions of the lens 42, and determining the formation of the recesses and projections 206 on the filter 204 according to the derived values, a light intensity distribution is obtained with even more suppression of non-uniformity. The quality of the externally transmitted image signal from the light detection unit 44 is higher in comparison to when the light intensity at the end portions is not greater than at the central portion in the fast scanning direction W.

Since light emitting elements having a large light intensity, such as LED's etc., are employed for the light emitting elements 35 the overall light intensity is raised, and it becomes possible to exchange the light detection unit 44 for one with a small exposure light intensity (low sensitivity).

Second Exemplary Embodiment

Explanation will now be given of a second exemplary embodiment of an image reading apparatus of the present invention, with reference to FIG. 7. Components that are similar to those of the first exemplary embodiment are allocated the same reference numerals and explanation thereof is omitted.

Figure 7:
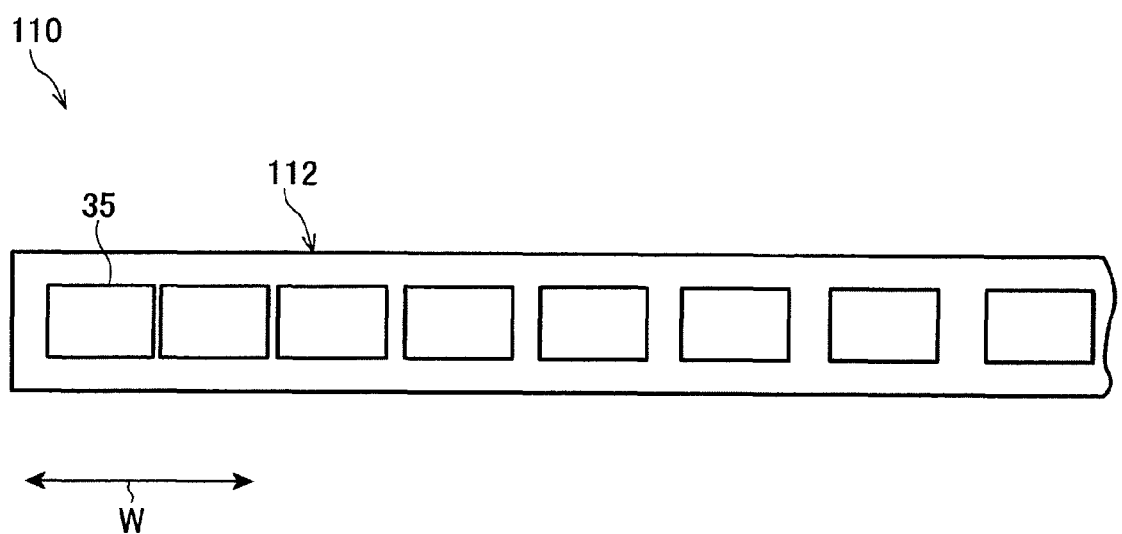
FIG. 7 is a plan view showing a light source of a second exemplary embodiment
Figure 8:
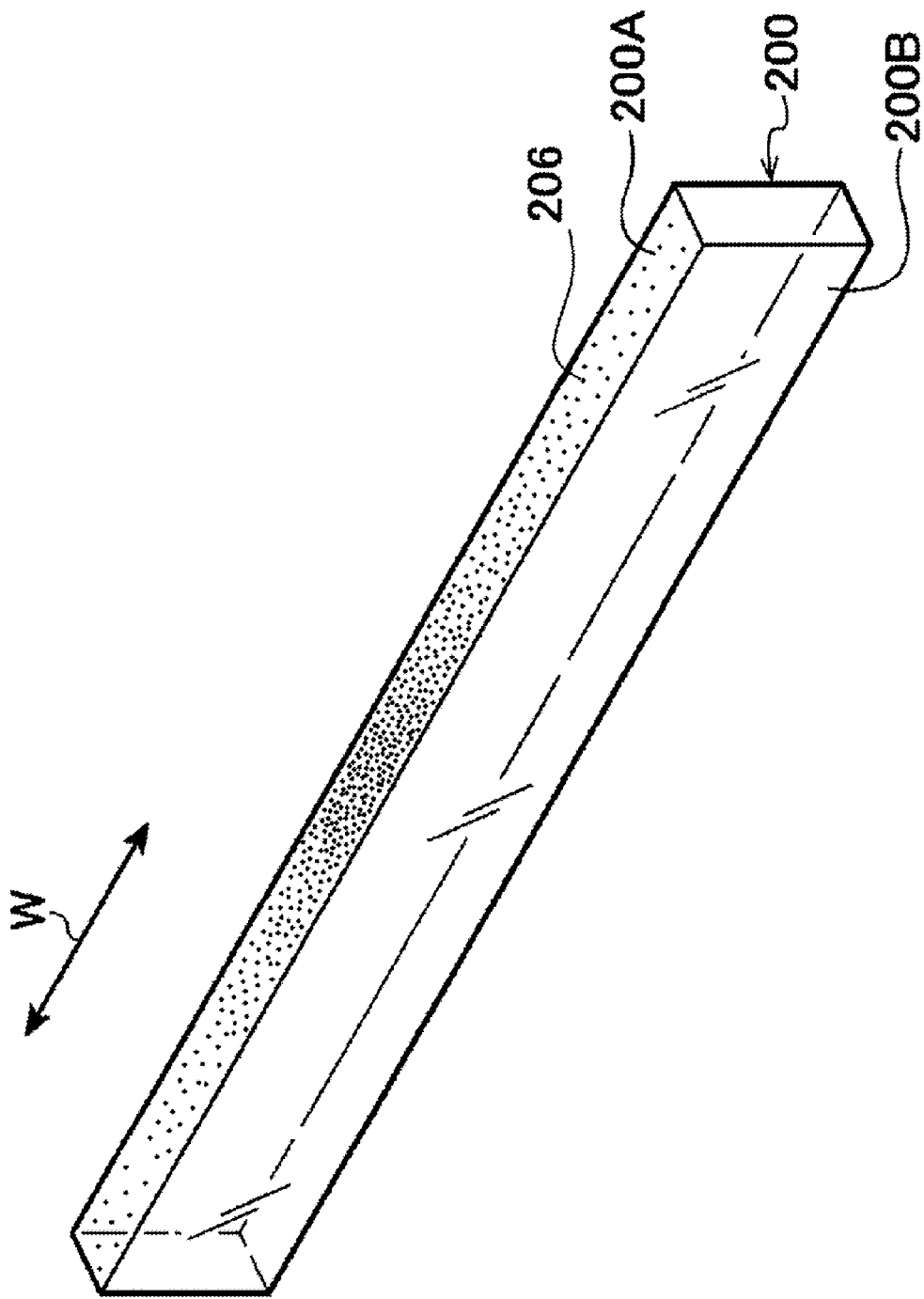
FIG. 8 is a perspective view of a light guide member having recesses and projections formed to a light emitting face of the light guide member.
Figure 9:
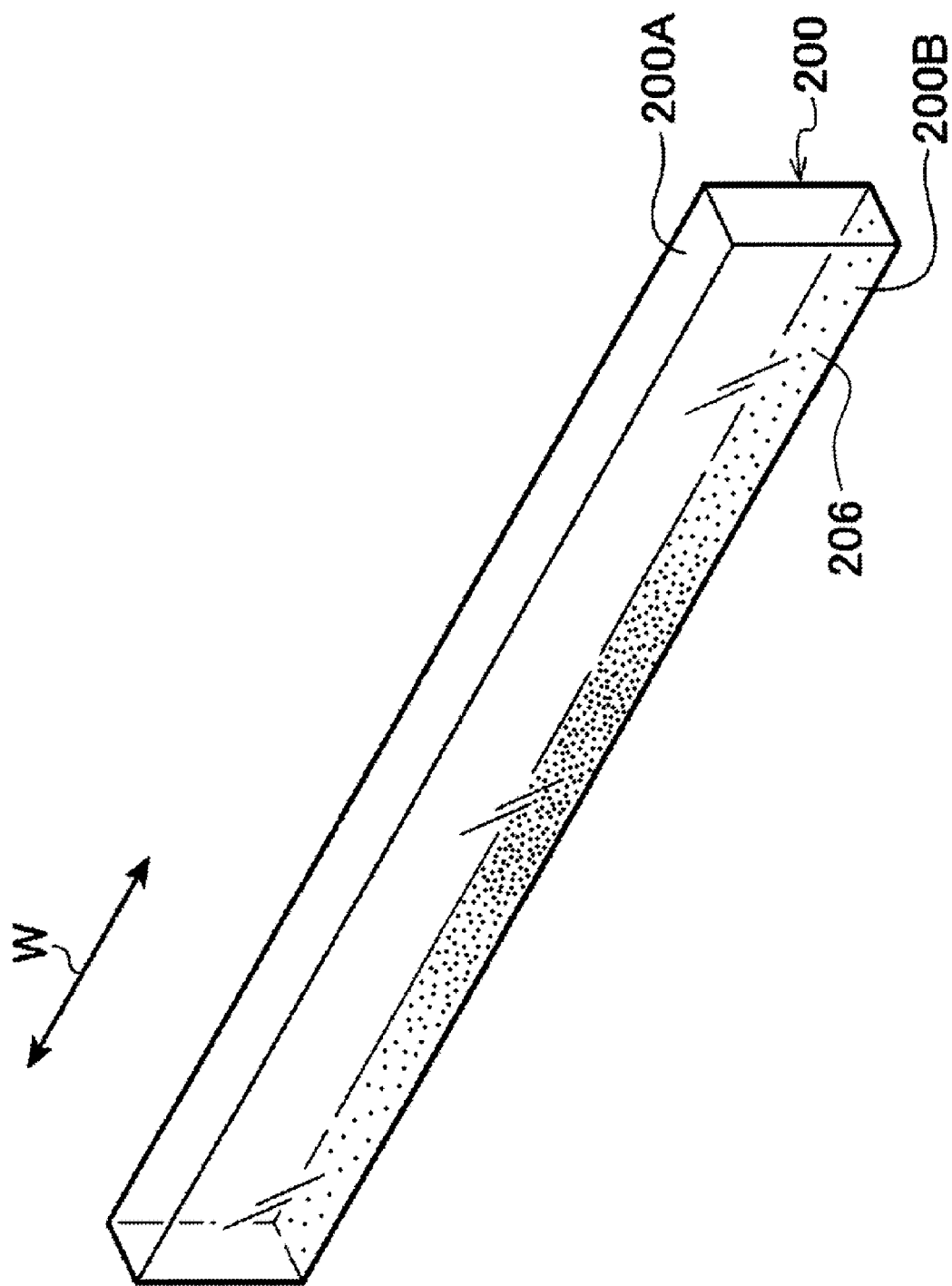
FIG. 9 is a perspective view of a light guide member having recesses and projections formed to a light incident face of the light guide member.

As shown in FIG. 7, an image reading apparatus 110 of the second exemplary embodiment employs a light source 112 with light emitting elements 35 disposed on a substrate such that the intervals between light emitting elements 35 become narrower at the end portions than at the central portion in the fast scanning direction W. The light intensity of illumination light emitted from the light source 112 is thereby greater at the end portions than at the central portion in the fast scanning direction W. The illumination light with a light intensity that is greater at the end portions than at the central portion in the fast scanning direction W has an even greater relative light intensity at the end portions after passing through the light guide member 200 and the filter 204. Thereby, even if the light attenuation amount at the edge portions in the lens 42 is large, non-uniformity in the light intensity distribution is suppressed. Since the recesses and projections 206 scatter the illumination light, if too many recesses and projections 206 are provide then the light intensity decreases, and so sufficient light intensity can be assured by combination with the light source 112.

Third Exemplary Embodiment

Explanation will now be given of a third exemplary embodiment of an image reading apparatus of the present invention. Components that are similar to those of the first exemplary embodiment are allocated the same reference numerals and explanation thereof is omitted.

In the image reading apparatus of the third exemplary embodiment, the variable resistor control unit 94 controls the resistance value of each of the variable resistors 92 (in other words, controls the current value flowing in each of the light emitting elements 35) based on the adjustment signal input from the CPU 70, adjusting the light intensity of each of the light emitting elements 35 such that the light intensity of illumination light emitted from the light source 34 is greater at the end portions than at the central portion in the fast scanning direction W. The light intensity of illumination light emitted from the light source 34 thereby becomes greater at the end portions than at the central portion in the fast scanning direction W. With the light intensity such as this, with illumination light at the end portions greater than at the central portion in the fast scanning direction W, has a further relative increase in light intensity at the end portions due to passing through the light guide member 200 and the filter 204. Thereby, even if the light attenuation amount at the edge portions in the lens 42 is large, non-uniformity in the light intensity distribution is suppressed. Since the recesses and projections 206 scatter the illumination light, if too many recesses and projections 206 are provided then the light intensity decreases, and so sufficient light intensity can be assured by adjusting the light intensity of the illumination light itself emitted from each of the light emitting elements 35.

It should be noted that while in the third exemplary embodiment configuration is made so as to control the current value of each of the light emitting elements 35 one-by-one, the present invention is not limited to such a configuration, and configuration may be made by forming plural groups with plural light emitting elements 35 in each group, and the current values controlled by group.

In the third exemplary embodiment, configuration is such that the light intensity of illumination light emitted from each of the light emitting elements 35 is greater at the end portions than at the central portion in the fast scanning direction W by controlling the current flowing in each of the light emitting elements 35, however the present invention is not limited to such a configuration. For example, the duty ratio of each of the light emitting elements 35 may be controlled, such that the light intensity of illumination light emitted from the light source 34 is greater at the end portions than at the central portion in the fast scanning direction W. Specifically, the ON-duty of the light emitting elements 35 at the end portions of the light source 34 in the fast scanning direction W is made longer than the ON-duty of the light emitting elements 35 at the central portion. As stated above, configuration may be made by forming plural groups with plural light emitting elements 35 in each group, and the duty ratios controlled by group.

In the exemplary embodiments described above, configurations were made with the recesses and projections 206 formed to the filter 204 that is bonded to the light emitting face 200A of the light guide member 200, however the present invention in not limited to such configurations. For example, configuration may be with the recesses and projections 206 formed to the light emitting face 200A and/or to the light incident face 200B of the light guide member 200, without employing a filter 204. It should be noted that a similar action is obtained in such cases to that of the first exemplary embodiment, and the number of components used is reduced by not using a filter 204.

In the exemplary embodiments described above, configurations were made with recesses and projections formed to the light guide member or a member, to which recesses and projections had been formed, was bonded to the light guide member, however the present invention is not limited to such configurations. For example, the ratio of internal light scattering in the light guide member may be adjusted, so as to exhibit a similar action to that when recesses and projections are provided.

In addition, in the exemplary embodiments described above, configurations where made employing the image reading apparatus as a standalone body, however the present invention is not limited so such configurations. For example, the image reading apparatus of the present invention may be installed in an image forming apparatus (for example, a multifunction machine, printer, facsimile machine etc.) that forms color and/or black and white images using an image forming method, such as an electrophotographic method, an electrostatic recording method and an ionography method etc., configured with external exchange of data using the external interface.

Explanation has been given of embodiments of the present invention by way of exemplary embodiments, however these are only examples of embodiments and various changes and modifications may be made thereto within a scope that does not depart from the spirit of the invention. Obviously the scope of rights of the present invention is not limited by these exemplary embodiments.

What is claimed is:

1. An image reading apparatus comprising:
   a light source with arrayed light emitting elements;
   a light guide unit that scatters light emitted from the light source such that the light intensity is greater at end portions than at the central portion in the array direction of the light emitting elements, and guides the light to a reading position of a medium to be read; and
   an optical system that guides the light reflected at the reading position to a light detection unit that detects the light intensity,
   wherein the light guide unit comprises:
      a light guide member that guides the light emitted from the light source to the reading position of the medium to be read; and
      recesses and projections that scatter the light, the recesses and projections being formed to a film body bonded to a light emitting face of the light guide member, and disposed with coarser intervals at the end portions than at the central portion in the array direction of the light emitting elements.

2. The image reading apparatus of claim 1, wherein in the light source the disposition intervals of the light emitting elements is narrower at the end portions than at the central portion in the array direction of the light emitting elements.

3. The image reading apparatus of claim 1, wherein in the light source the light intensity of the light emitting elements is adjusted such that the light intensity is greater at the end portions than at the central portion in the array direction of the light emitting elements.

4. An image reading apparatus comprising:
   a light source with arrayed light emitting elements;
   a light guide unit that scatters light emitted from the light source such that the light intensity is greater at end portions than at the central portion in the array direction of the light emitting elements, and guides the light to a reading position of a medium to be read; and
   an optical system that guides the light reflected at the reading position to a light detection unit that detects the light intensity,
   wherein the light guide unit comprises:
      a light guide member that guides the light emitted from the light source to the reading position of the medium to be read; and
      recesses and projections that scatter the light, the recesses and projections being formed to at least one of a light emitting face and a light incident face of the light guide member, and disposed with coarser intervals at the end portions than at the central portion in the array direction of the light emitting elements.

5. The image reading apparatus of claim 4, wherein in the light source the disposition intervals of the light emitting elements is narrower at the end portions than at the central portion in the array direction of the light emitting elements.

6. The image reading apparatus of claim 4, wherein in the light source the light intensity of the light emitting elements is adjusted such that the light intensity is greater at the end portions than at the central portion in the array direction of the light emitting elements.

7. The image reading apparatus of claim 4, wherein the recesses and projections are formed to both of the light emitting face and the light incident face of the light guide member.

8. The image reading apparatus of claim 4, wherein the recesses and projections are formed to only one of the light emitting face and the light incident face of the light guide member.

* * * * *